(12) United States Patent
Kumar et al.

(10) Patent No.: US 11,310,687 B2
(45) Date of Patent: Apr. 19, 2022

(54) TECHNIQUES FOR UE MOBILITY PREDICTION BASED RADIO RESOURCE MANAGEMENT

(71) Applicant: QUALCOMM Incorporated, San Diego, CA (US)

(72) Inventors: Rajeev Kumar, San Diego, CA (US); Xipeng Zhu, San Diego, CA (US); Ozcan Ozturk, San Diego, CA (US); Shankar Krishnan, San Diego, CA (US); Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,223

(22) Filed: Jul. 23, 2020

(65) Prior Publication Data

US 2022/0030453 A1    Jan. 27, 2022

(51) Int. Cl.
*H04W 8/08* (2009.01)
*H04W 24/10* (2009.01)
*H04W 36/06* (2009.01)
*H04W 76/27* (2018.01)

(52) U.S. Cl.
CPC ............ *H04W 24/10* (2013.01); *H04W 8/08* (2013.01); *H04W 36/06* (2013.01); *H04W 76/27* (2018.02)

(58) Field of Classification Search
CPC ..... H04W 24/10; H04W 36/06; H04W 76/27; H04W 8/08
See application file for complete search history.

(56) References Cited

U.S. PATENT DOCUMENTS

| | | |
|---|---|---|
| 2015/0038140 A1 | 2/2015 | Kilpatrick, II et al. |
| 2015/0215742 A1 | 7/2015 | Ikeda et al. |
| 2019/0150059 A1* | 5/2019 | Vajapeyam ........... H04L 69/323 370/329 |

FOREIGN PATENT DOCUMENTS

| | | |
|---|---|---|
| EP | 0859476 A2 | 8/1998 |
| EP | 1713292 A1 | 10/2006 |

OTHER PUBLICATIONS

International Search Report and Written Opinion—PCT/US2021/038673—ISA/EPO—dated Oct. 21, 2021.

* cited by examiner

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a user equipment (UE) may determine a mobility prediction for the UE. The UE may determine one or more radio resource management (RRM) measurement parameters based at least in part on the mobility prediction. The UE may perform one or more RRM measurements based at least in part on the one or more RRM measurement parameters. Numerous other aspects are provided.

30 Claims, 8 Drawing Sheets

TECHNIQUES FOR UE MOBILITY PREDICTION BASED RADIO RESOURCE MANAGEMENT

FIELD OF THE DISCLOSURE

Aspects of the present disclosure generally relate to wireless communication and to techniques for user equipment (UE) mobility prediction based radio resource management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a mobility prediction for the UE; determining one or more radio resource management (RRM) measurement parameters based at least in part on the mobility prediction; and performing one or more RRM measurements based at least in part on the one or more RRM measurement parameters.

In some aspects, determining the one or more RRM measurement parameters includes determining one or more reduced RRM measurement parameters that are reduced relative to one or more baseline RRM measurement parameters. In some aspects, the one or more reduced RRM measurement parameters comprise at least one of a reduced number of RRM measurements relative to a baseline number of RRM measurements included in the one or more baseline RRM measurement parameters, a reduced RRM measurement time duration relative to a baseline RRM measurement time duration included in the one or more baseline RRM measurement parameters, or a reduced number of RRM measurement targets relative to a baseline number of RRM measurement targets included in the one or more baseline RRM measurement parameters.

In some aspects, determining the one or more reduced RRM measurement parameters includes determining the reduced number of RRM measurement targets based at least in part on at least one of mobility prediction for the UE indicating that a probability that the UE will travel into one or more neighboring cells does not satisfy a first threshold, a signal measurement for a serving cell of the UE satisfying a second threshold, or a priority of the serving cell being greater than respective priorities of each of the one or more neighboring cells. In some aspects, the UE is in a radio resource control (RRC) connected mode with a base station (BS); and the method further includes transmitting, to the BS, an indication of the mobility prediction for the UE.

In some aspects, transmitting the indication of the mobility prediction includes transmitting the indication of the mobility prediction in at least one of a UE assistance information communication, a measurement report, an RRC reconfiguration complete communication, or an RRC communication. In some aspects, the mobility prediction indicates at least one of a neighboring cell, a probability that the UE will move into the neighboring cell, a confidence level of the probability, an expected arrival time in the neighboring cell, a route identifier, or a probability that the UE will use a route associated with the route identifier.

In some aspects, the method includes receiving, from the BS, an indication of a plurality of RRM measurement objects, wherein determining the one or more RRM measurement parameters includes determining an RRM measurement object, from the plurality of RRM measurement objects, based at least in part on the mobility prediction; and determining the one or more RRM measurement parameters based at least in part on the RRM measurement object. In some aspects, the method includes receiving, from the BS, an indication of an RRM measurement parameter range; and wherein determining the one or more RRM measurement parameters includes determining the one or more RRM measurement parameters based at least in part on the mobility prediction for the UE and the RRM measurement parameter range.

In some aspects, the UE is in an RRC idle mode or an RRC inactive mode; and determining the one or more RRM measurement parameters includes determining that the mobility prediction for the UE satisfies an RRM measurement reduction parameter; and determining the one or more RRM measurement parameters based at least in part on a determination that that mobility prediction for the UE satisfies the RRM measurement reduction parameter. In some aspects, the method includes receiving, in an RRC release communication, at least one of an indication that RRM measurement reduction is permitted for the UE, an indication of the RRM measurement reduction parameter, or an indication to perform one or more early measurements.

In some aspects, RRM measurement reduction is indicated as being permitted on at least one of a per-carrier basis or a per-cell basis. In some aspects, the UE is in an RRC idle mode or an RRC inactive mode; and determining the one or more RRM measurement parameters includes determining that the mobility prediction for the UE does not satisfy an RRM measurement reduction parameter; and determining the one or more RRM measurement parameters based at least in part on a determination that that mobility prediction for the UE does not satisfy the RRM measurement reduction parameter.

In some aspects, the one or more RRM measurement parameters include one or more intra-frequency cell reselection parameters; and determining the one or more RRM measurement parameters includes determining the one or more intra-frequency cell reselection parameters based at least in part on at least one of: the mobility prediction for the UE, historical UE mobility information, or one or more measurement reports associated with at least one of the UE or one or more other UEs. In some aspects, the one or more RRM measurement parameters include an inter-frequency cell reselection measurement prioritization for a plurality of neighboring cells; and determining the one or more RRM measurement parameters includes determining a UE-based inter-frequency cell reselection measurement prioritization based at least in part on the mobility prediction for the UE; and determining the inter-frequency cell reselection measurement prioritization based at least in part on at least one of: the UE-based inter-frequency cell reselection measurement prioritization, a network-based inter-frequency cell reselection measurement prioritization, or a tradeoff parameter.

In some aspects, the method includes receiving an indication of the network-based inter-frequency cell reselection measurement prioritization and an indication of the tradeoff parameter in at least one of: system information, or an RRC connection release communication. In some aspects, the one or more RRM measurement parameters include an inter-radio access technology (RAT) target measurement prioritization for a plurality of neighboring RATs; and determining the one or more RRM measurement parameters includes determining a UE-based inter-RAT target measurement prioritization based at least in part on the mobility prediction for the UE; and determining the inter-RAT target measurement prioritization based at least in part on at least one of: the UE-based inter-RAT target measurement prioritization, a network-based inter-RAT target measurement prioritization, or a tradeoff parameter. In some aspects, the method includes receiving an indication of the network-based inter-RAT target measurement prioritization and an indication of the tradeoff parameter in at least one of: system information, or an RRC connection release communication.

In some aspects, a UE for wireless communication includes: a memory; and one or more processors operatively coupled to the memory, the memory and the one or more processors configured to: determine a mobility prediction for the UE; determine one or more RRM measurement parameters based at least in part on the mobility prediction; and perform one or more RRM measurements based at least in part on the one or more RRM measurement parameters.

In some aspects, the one or more processors, when determining the one or more RRM measurement parameters, are configured to determine one or more reduced RRM measurement parameters that are reduced relative to one or more baseline RRM measurement parameters. In some aspects, the one or more reduced RRM measurement parameters comprise at least one of a reduced number of RRM measurements relative to a baseline number of RRM measurements included in the one or more baseline RRM measurement parameters, a reduced RRM measurement time duration relative to a baseline RRM measurement time duration included in the one or more baseline RRM measurement parameters, or a reduced number of RRM measurement targets relative to a baseline number of RRM measurement targets included in the one or more baseline RRM measurement parameters.

In some aspects, the one or more processors, when determining the one or more reduced RRM measurement parameters, are configured to: determine the reduced number of RRM measurement targets based at least in part on at least one of: mobility prediction for the UE indicating that a probability that the UE will travel into one or more neighboring cells does not satisfy a first threshold, a signal measurement for a serving cell of the UE satisfying a second threshold, or a priority of the serving cell being greater than respective priorities of each of the one or more neighboring cells.

In some aspects, the UE is in an RRC connected mode with a BS and the method further includes transmitting, to the BS, an indication of the mobility prediction for the UE. In some aspects, the mobility prediction indicates at least one of a neighboring cell, a probability that the UE will move into the neighboring cell, a confidence level of the probability, an expected arrival time in the neighboring cell, a route identifier, or a probability that the UE will use a route associated with the route identifier. In some aspects, the UE is in an RRC idle mode or an RRC inactive mode; and the one or more processors, when determining the one or more RRM measurement parameters, are configured to: determine that the mobility prediction for the UE satisfies an RRM measurement reduction parameter; and determine the one or more RRM measurement parameters based at least in part on a determination that that mobility prediction for the UE satisfies the RRM measurement reduction parameter.

In some aspects, the UE is in an RRC idle mode or an RRC inactive mode; and the one or more processors, when determining the one or more RRM measurement parameters, are configured to: determine that the mobility prediction for the UE does not satisfy an RRM measurement reduction parameter; and determine the one or more RRM measurement parameters based at least in part on a determination that that mobility prediction for the UE does not satisfy the RRM measurement reduction parameter.

In some aspects, a non-transitory computer-readable medium storing a set of instructions for wireless communication includes: one or more instructions that, when executed by one or more processors of a UE, cause the UE to determine a mobility prediction for the UE; determine one or more radio RRM measurement parameters based at least in part on the mobility prediction; and perform one or more RRM measurements based at least in part on the one or more RRM measurement parameters.

In some aspects, the UE is in a RRC idle mode or an RRC inactive mode; and the one or more instructions, that cause the UE to determine the one or more RRM measurement parameters, cause the UE to determine that the mobility prediction for the UE satisfies an RRM measurement reduction parameter; and determine the one or more RRM measurement parameters based at least in part on a determination that that mobility prediction for the UE satisfies the RRM measurement reduction parameter.

In some aspects, an apparatus for wireless communication includes: means for determining a mobility prediction for the apparatus; means for determining one or RRM measurement parameters based at least in part on the mobility prediction; and means for performing one or more RRM measurements based at least in part on the one or more RRM measurement parameters.

In some aspects, the means for determining the one or more RRM measurement parameters includes means for determining one or more reduced RRM measurement parameters that are reduced relative to one or more baseline RRM measurement parameters, wherein the one or more reduced RRM measurement parameters comprise at least one of a reduced number of RRM measurements relative to a baseline number of RRM measurements included in the one or more baseline RRM measurement parameters, a reduced RRM measurement time duration relative to a baseline RRM measurement time duration included in the one or more baseline RRM measurement parameters, or a reduced number of RRM measurement targets relative to a baseline number of RRM measurement targets included in the one or more baseline RRM measurement parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
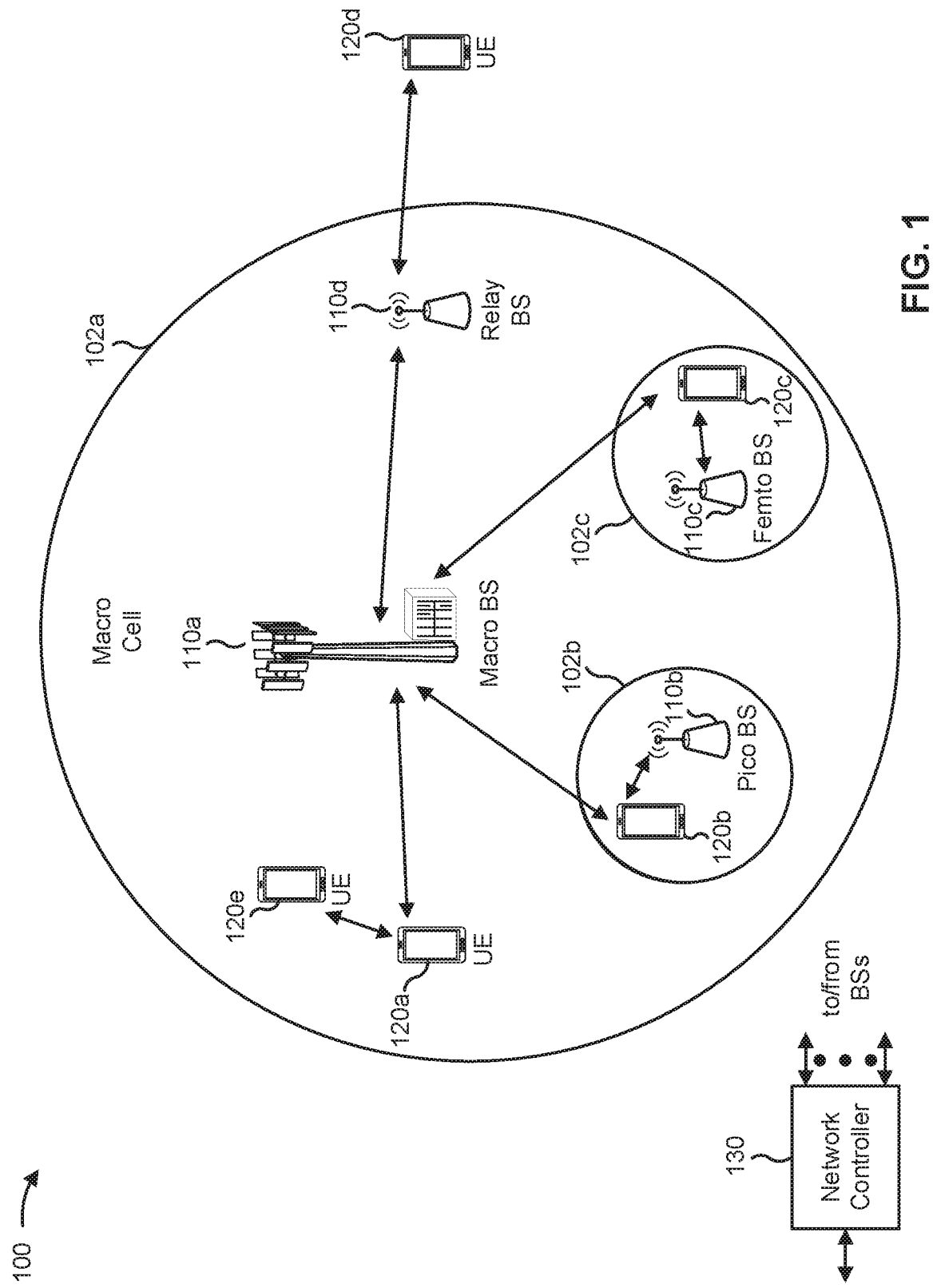
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
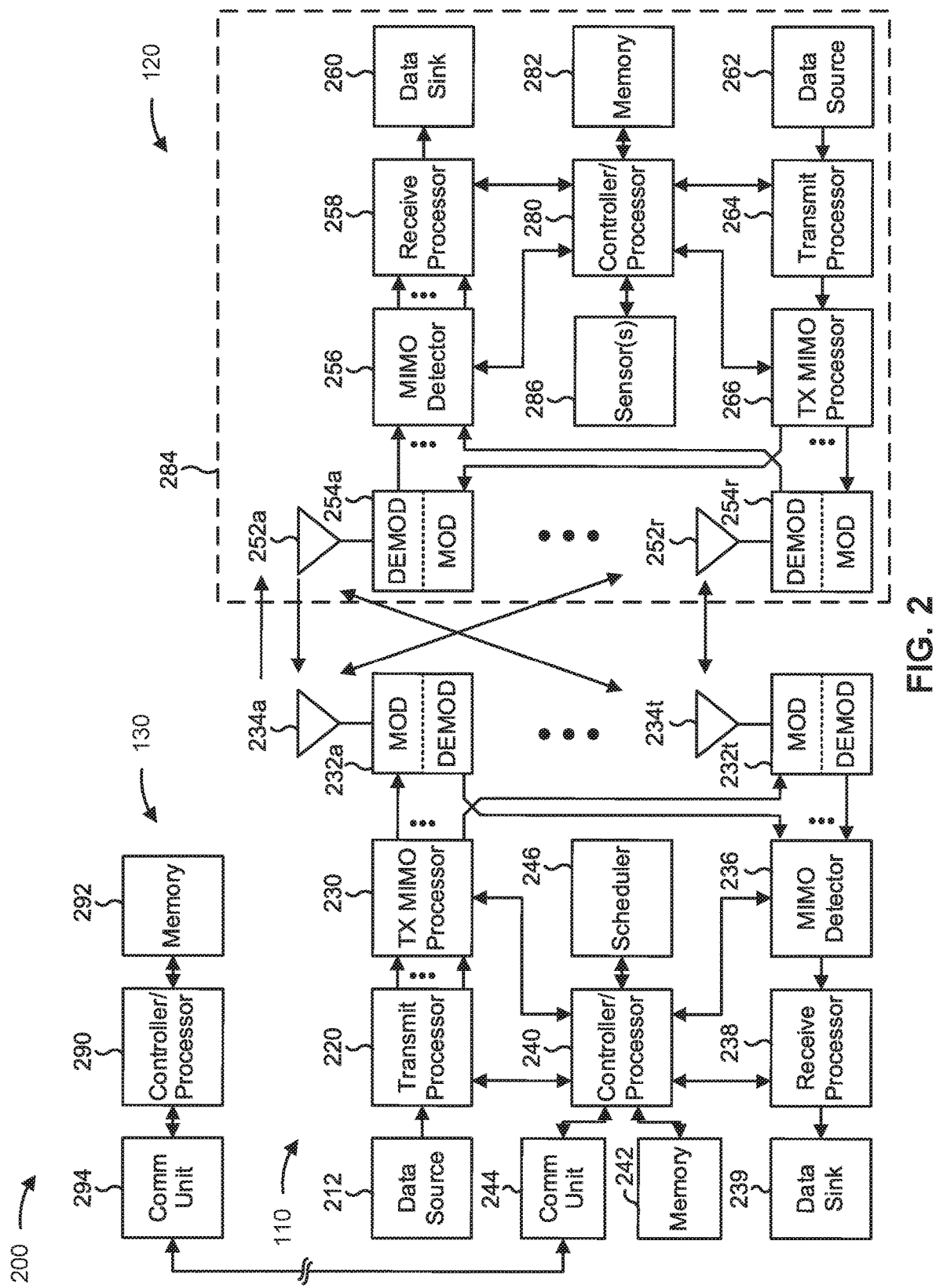
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like.

As further shown in FIG. 2, UE 120 may include one or more sensors 286. Sensor(s) 286 may include an optical sensor that has a field of view in which sensor(s) 286 may determine one or more characteristics of an environment of the UE 120, may include a camera, may include magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e. g, that uses triangulation, multi-lateration, etc.), and/or the like), a gyroscope (e. g., a micro-electro-mechanical systems (IVEEMS) gyroscope or a similar type of device), an accelerometer, a speed sensor, a motion sensor, an infrared sensor, a temperature sensor, a pressure sensor, and/or the like. In some aspects, sensor(s) 286 may generate various types of sensor data, such as positioning data, location data, movement and/or mobility data, orientation data, and/or other types of sensor data. In some aspects, the UE 120 may use the sensor data to perform a mobility prediction for the UE 120, as described herein. In some aspects, one or more components of UE 120 may be included in a housing 284, mounted to or installed on the housing 284, and/or the like.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with UE mobility prediction-based radio resource management (RRM), as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, interpreting the instructions, and/or the like.

In some aspects, a UE 120 may include means for determining (e.g., receive processor 258, transmit processor 264, controller/processor 280, memory 282, sensor(s) 286, and/or the like) a mobility prediction for the UE 120, means for determining (e.g., receive processor 258, transmit processor 264, controller/processor 280, memory 282, and/or the like) one or more RRM measurement parameters based at least in part on the mobility prediction, means for performing (e.g., using antenna 252, DEMOD 254, MIMO detector 256, receive processor 258, controller/processor 280, memory 282, transmit processor 264, TX MIMO processor 266, MOD 254, and/or the like) one or more RRM measurements based at least in part on the one or more RRM measurement parameters, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, memory 282, sensor(s) 286, and/or the like.

As indicated above, FIG. 2 is provided as an example. Other examples may differ from what is described with regard to FIG. 2.

A UE may perform RRM measurements in a wireless network for purposes of radio resource management. Radio resource management (or RRM) refers to a collection of various techniques that may be used to manage, configure, conserve, optimize, and/or control radio resource usage in a wireless network. For example, the UE may perform the RRM measurements, may transmit results of the RRM measurements to a base station, and the base station may configure transmit power, radio resource allocation, beamforming, data rates, modulation coding schemes, error correction, handover parameters, and/or the like for the UE.

RRM measurements may include signal power measurements, signal strength measurements, latency measurements, signal quality measurements, interference measurements, noise measurements, neighbor cell measurements, serving cell measurements, and/or the like. While performing RRM measurements may assist a base station in configuring various wireless communication parameters for a UE, performing the RRM measurements may consume large amounts of battery resources of the UE, radio resources of the UE, processing and memory resources of the UE, and/or the like.

Some aspects described herein provide techniques for UE mobility prediction based RRM. In some aspects, a UE may reduce or relax the RRM measurements that the UE is to perform based at least in part on a mobility prediction determined by the UE. The mobility prediction may indicate whether the UE is likely to move in and/or through one or more neighboring cells, may indicate an expected arrival time at one or more neighboring cells, may indicate a duration of time that the UE will be in one or more neighboring cells, and/or other predicted or estimated indicators of mobility of the UE. In this way, the UE may determine to reduce or relax RRM measurements for particular cells and/or may determine to maintain a baseline level of RRM measurements for other cells based at least in part on the mobility prediction. This enables the UE to reduce resource consumption (e.g., processing resources, memory resources, battery resources, radio resources, and/or the like) while maintaining a high level of handover reliability and mobility reliability.

Figure 3:
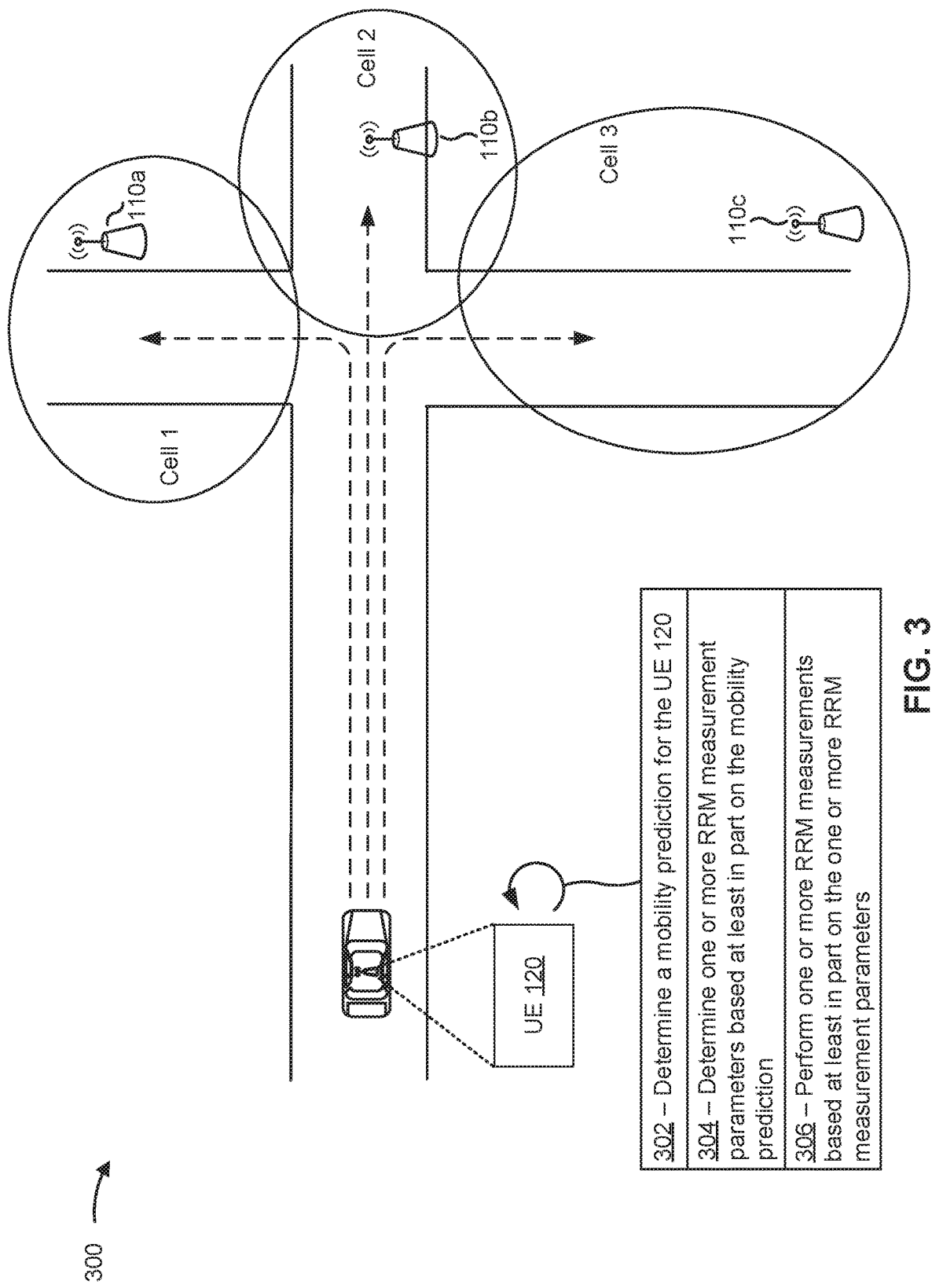
FIGS. 3-5 are diagrams illustrating examples associated with UE mobility prediction based radio resource management (RRM), in accordance with various aspects of the present disclosure.

FIG. 3 is a diagram illustrating an example 300 associated with UE mobility prediction based RRM, in accordance with various aspects of the present disclosure. As shown in FIG. 3, example 300 includes a UE 120 and one or more BSs 110 (e.g., BS 110a, BS 110b, BS 110c, and/or the like). In some aspects, the BSs 110 and the UE 120 may be included in a wireless network, such as wireless network 100. BSs 110 and the UE 120 may communicate on a wireless access link, which may include an uplink and a downlink.

The BSs 110 may each provide a cell in which wireless communication devices (e.g., UEs) may be served with access to the wireless network. For example, the BS 110a may provide cell 1, the BS 110b may provide cell 2, and the BS 110c may provide cell 3. Cells 1-3 may be neighboring cells or cells that are not serving the UE 120. UE 120 is capable of performing RRM measurements for purposes of RRM. In these cases, the UE 120 may perform one or more signal measurements, latency measurements, distance measurements, and/or other types of measurements associated with cells 1-3 to support handover of the UE 120 and/or for other purposes.

In some aspects, the UE 120 may support various communication modes. For example, the UE 120 may support a connected communication mode (e.g., a radio resource control (RRC) connected mode), an idle communication mode (e.g., an RRC idle mode), an inactive communication mode (e.g., an RRC inactive mode), and/or the like. The RRC connected mode may be a communication mode in which the UE 120 is communicatively connected with a BS 110 and is active. The RRC idle mode may be a communication mode in which the UE 120 is not communicatively connected with a BS 110. In the RRC idle mode, the UE 120 may conserve power by deactivating one or more components of the UE 120, such as an antenna or antenna panel, a communication chain, and/or the like. The RRC inactive mode may functionally reside between the RRC connected mode and RRC idle mode. In the RRC inactive mode, the UE 120 may be communicatively connected with a BS 110, but the RRC connection with the BS 110 may be suspended and/or inactive. The BS 110 may store a UE context (e.g., an access stratum (AS) context, higher-layer configurations, and/or the like) associated with the UE 120. This permits the UE 120 and/or the BS 110 to apply the stored UE context when the UE 120 transitions from the RRC inactive mode to the RRC connected mode.

As shown in FIG. 3, and by reference number 302, the UE 120 may determine (e.g., using receive processor 258, transmit processor 264, controller/processor 280, memory 282, sensor(s) 286, mobility prediction component 708, and/or the like) a mobility prediction for the UE 120. The mobility prediction may be a prediction or estimation of an expected path of movement of the UE 120. In other words, the mobility prediction may be a prediction or estimation of a direction in which the UE 120 is likely to travel, a path along which the UE 120 is likely to travel, a speed and/or acceleration at which the UE 120 is likely to travel, an estimated movement pattern for the UE 120, and/or the like.

In some aspects, the mobility prediction may be a determination of a probability or a likelihood that the UE 120 will move into one or more cells (e.g., one or more neighboring cells such as cells 1-3 and/or other cells). As an example, the mobility prediction for the UE 120 may indicate a probability or a likelihood that the UE 120 will move into cell 1, a probability or a likelihood that the UE 120 will move into cell 2, a probability or a likelihood that the UE 120 will move into cell 3, and/or the like. In some aspects, the mobility prediction may indicate a probability or a likelihood that the UE 120 will move into a particular cell within a particular time period. In some aspects, the mobility prediction may indicate confidence level for a probability or a likelihood that the UE 120 will move into a particular cell. In some aspects, the mobility prediction may indicate an expected arrival time in a particular cell. In some aspects, the mobility prediction may indicate an expected time duration for which the UE 120 will remain in a particular cell. In some aspects, the mobility prediction may indicate one or more candidate route identifiers (e.g., an identifier of a route or a communication path for traffic to and/or from the UE 120) for the UE 120. In some aspects, the mobility prediction may indicate a probability or a likelihood that a route associated with a particular candidate route identifier will be used by the UE 120 at a particular point in time. In some aspects, the mobility prediction may indicate combinations of the above parameters and/or other parameters of expected, predicted, and/or estimated mobility of the UE 120.

The UE 120 may determine the mobility prediction based at least in part on various inputs, various parameters, and/or other types of data. In some aspects, the UE 120 may determine the mobility prediction based at least in part on signal measurements, pathloss measurements, distance measurements, and/or other types of cell measurements of signals from nearby cells. For example, the UE 120 may determine that the UE 120 is moving closer or further away from a cell based at least in part on cell measurements associated of signals from the cell.

In some aspects, the UE 120 may determine the mobility prediction based at least in part on sensor data from one or more sensors (e.g., sensor(s) 286) of the UE 120. For example, the UE 120 may determine a path of travel of the UE 120 based at least in part on GPS navigation data, may determine that the UE 120 is accelerating in a particular direction based at least in part on accelerometer data, may determine that the UE 120 is facing a particular direction based at least in part on gyroscope data, and/or the like.

In some aspects, the UE 120 may determine the mobility prediction based at least in part on historical mobility information for the UE 120. The historical mobility information may include information identifying previously traveled paths for the UE 120, previous navigation destinations of the UE 120, frequency of paths traveled by the UE 120, saved routes and/or points of interest by the UE 120, times of day that the UE 120 traveled along a particular path and/or to a particular destination, and/or the like.

In some aspects, the UE 120 may determine the mobility prediction based at least in part on a type of travel. For example, the mobility prediction may be based at least in part on the UE 120 being located in a vehicle, based at least in part on the UE 120 be associated with a pedestrian, and/or the like.

In some aspects, the UE 120 may determine the mobility prediction based at least in part on a combination of the above inputs, parameters, and/or data, and/or other types of inputs, parameters, and/or data. As an example of the above, the UE 120 may determine the mobility prediction to include a 0.8 probability that the UE 120 will travel into cell 1 to a work destination, a 0.15 probability that the UE 120 will travel into cell 2 to a restaurant, and a probability that the UE 120 will travel into cell 3 to a home destination based at least in part on a direction of travel of a vehicle associated with the UE 120, based at least in part on a time of day, and based at least in part on the UE 120 historically traveling to the work destination at the time of day.

As further shown in FIG. 3, and by reference number 304, the UE 120 may determine (e.g., using receive processor 258, transmit processor 264, controller/processor 280, memory 282, RRM measurement parameter component 710, and/or the like) one or more RRM measurement parameters based at least in part on the mobility prediction. The one or more RRM measurement parameters may include a number of RRM measurements that are to be performed for a particular cell and/or for a particular frequency carrier in a cell, may include a frequency or time duration between RRM measurements for a particular cell and/or for a particular frequency carrier in a cell, may include whether the UE 120 is to perform RRM measurements for a particular cell and/or for a particular frequency carrier in a cell, and/or the like. In this way, the UE 120 may reduce or relax the RRM measurement parameters for particular cells and/or frequency carriers, relative to baseline RRM measurement parameters for the UE 120 and/or for the wireless network, based at least in part on the mobility prediction. For example, the UE 120 may perform fewer RRM measurements relative to a baseline number of RRM measurements, reduce the frequency of RRM measurements relative to a baseline frequency of RRM measurements, may reduce the number of RRM measurement targets (e.g., cells, frequency carriers, and/or the like) relative to a baseline number of RRM measurement targets, and/or the like.

In some aspects, the UE 120 may reduce or relax the RRM measurement parameters for a particular cell or for a particular frequency carrier based at least in part on the mobility prediction indicating that a probability the UE 120 will move into the cell and/or use the frequency carrier does not satisfy a probability threshold. As an example, the UE 120 may perform fewer RRM measurements, may perform RRM measurements for a shorter time duration, or may refrain from performing RRM measurements altogether for cell 3 based at least in part on determining that the probability the UE 120 will move into cell 3, indicated in the mobility prediction, does not satisfy a probability threshold.

In some aspects, the UE 120 may reduce or relax the RRM measurement parameters for a particular cell and/or for a particular frequency carrier based at least in part on other parameters in addition to and/or instead of the mobility prediction. For example, the UE 120 may reduce or relax the RRM measurement parameters for a particular cell and/or for a particular frequency carrier based at least in part on determining that a measured signal strength (e.g., an RSRP, an RSSI, and/or the like) and/or a measured signal quality (e.g., an RSRQ, a CQI, and/or the like) satisfies a threshold. As another example, the UE 120 may reduce or relax the RRM measurement parameters for a particular cell and/or for a particular frequency carrier based at least in part on determining that a measured signal strength and/or a measured signal is within a particular range. As another example, the UE 120 may reduce or relax the RRM measurement parameters for a particular cell and/or for a particular frequency carrier based at least in part on determining that a priority (e.g., a cell priority, a frequency carrier priority, and/or the like) associated with the cell and/or the frequency carrier is lower than (or not higher than) a serving cell of the UE 120 if the UE 120 is in an RRC connected mode with a BS 110.

As further shown in FIG. 3, and by reference number 306, the UE 120 may perform (e.g., using antenna 252, DEMOD 254, MIMO detector 256, receive processor 258, controller/processor 280, memory 282, transmit processor 264, TX MIMO processor 266, MOD 254, memory 282, RRM measurement component 712, and/or the like) one or more RRM measurements based at least in part on the one or more RRM measurement parameters. For example, the UE 120 may perform a number of RRM measurements for a cell (e.g., cell 1, cell 2, cell 3, and/or other cells) and/or a frequency carrier in a cell based at least in part on a number of RRM measurements indicated by the one or more RRM measurement parameters. As another example, the UE 120 may perform RRM measurements at a particular frequency or time interval based at least in part on a measurement frequency or a measurement time interval indicated by the one or more RRM measurement parameters. As another example, the UE 120 may perform RRM measurements for particular cells and/or frequency carriers and may refrain from performing RRM measurements for other cells and/or frequency carriers based at least in part on the one or more RRM measurement parameters, and/or the like.

In this way, the UE 120 may determine to reduce or relax RRM measurements for particular cells and/or may determine to maintain a baseline level of RRM measurements for other cells based at least in part on the mobility prediction. This enables the UE 120 to reduce resource consumption (e.g., processing resources, memory resources, battery resources, radio resources, and/or the like) while maintaining a high level of handover reliability and mobility reliability.

As indicated above, FIG. 3 is provided as an example. Other examples may differ from what is described with respect to FIG. 3.

Figure 4:
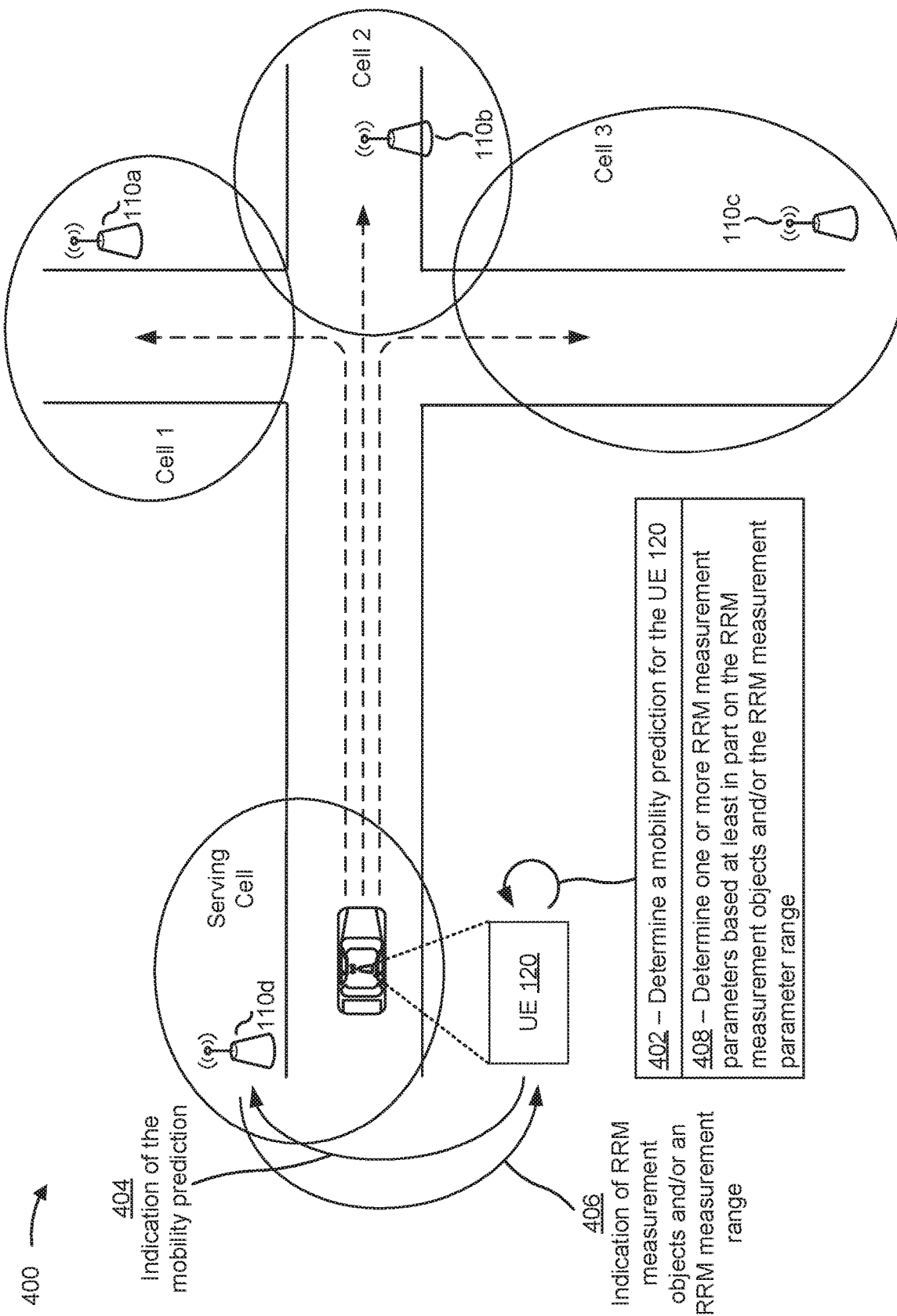

FIG. 4 is a diagram illustrating an example 400 associated with UE mobility prediction based RRM, in accordance with various aspects of the present disclosure. As shown in FIG. 4, example 400 includes a UE 120 and one or more BSs 110 (e.g., BS 110a, BS 110b, BS 110c, BS 110d, and/or the like). In some aspects, the BSs 110 and the UE 120 may be included in a wireless network, such as wireless network 100. BSs 110 and the UE 120 may communicate on a wireless access link, which may include an uplink and a downlink.

The BSs 110 may each provide a cell in which wireless communication devices (e.g., UEs) may be served with access to the wireless network. For example, the BS 110a may provide cell 1, the BS 110b may provide cell 2, and the BS 110c may provide cell 3. Cells 1-3 may be neighboring cells or cells that are not serving the UE 120. UE 120 is capable of performing RRM measurements for purposes of RRM. In these cases, the UE 120 may perform one or more signal measurements, latency measurements, distance measurements, and/or other types of measurements associated with cells 1-3 to support handover of the UE 120 and/or for other purposes. Moreover, the UE 120 may be communicatively connected with the BS 110d in an RRC connected mode. The BS 110d may provide the UE 120 with a serving cell in which the UE 120 communicates with the wireless network and/or other wireless communication devices in the wireless network.

As shown in FIG. 4, and by reference number 402, the UE 120 may determine (e.g., using receive processor 258, transmit processor 264, controller/processor 280, memory 282, sensor(s) 286, mobility prediction component 708, and/or the like) a mobility prediction for the UE 120. In some aspects, the UE 120 determines the mobility prediction based at least in part on one or more techniques described above in connection with FIG. 3 and/or other techniques for mobility prediction.

As further shown in FIG. 4, and by reference number 404, the UE 120 may transmit (e.g., using controller/processor 280, transmit processor 264, TX MIMO processor 266, MOD 254, antenna 252, memory 282, transmission component 704, and/or the like) an indication of the mobility prediction to the BS 110d. In some aspects, the UE 120 may transmit the indication of the mobility prediction to the BS 110d on an uplink of a wireless access link between the UE 120 and the BS 110d. In these cases, the UE 120 may transmit the indication of the mobility prediction in an uplink communication. The uplink communication may include a UE assistance information communication, a measurement report (e.g., a channel state information (CSI) report, a beam measurement report, or another type of measurement report), an RRC communication, an RRC reconfiguration complete communication (e.g., after receiving an RRC reconfiguration communication from the BS 110d), and/or another type of uplink communication.

Figure 8:
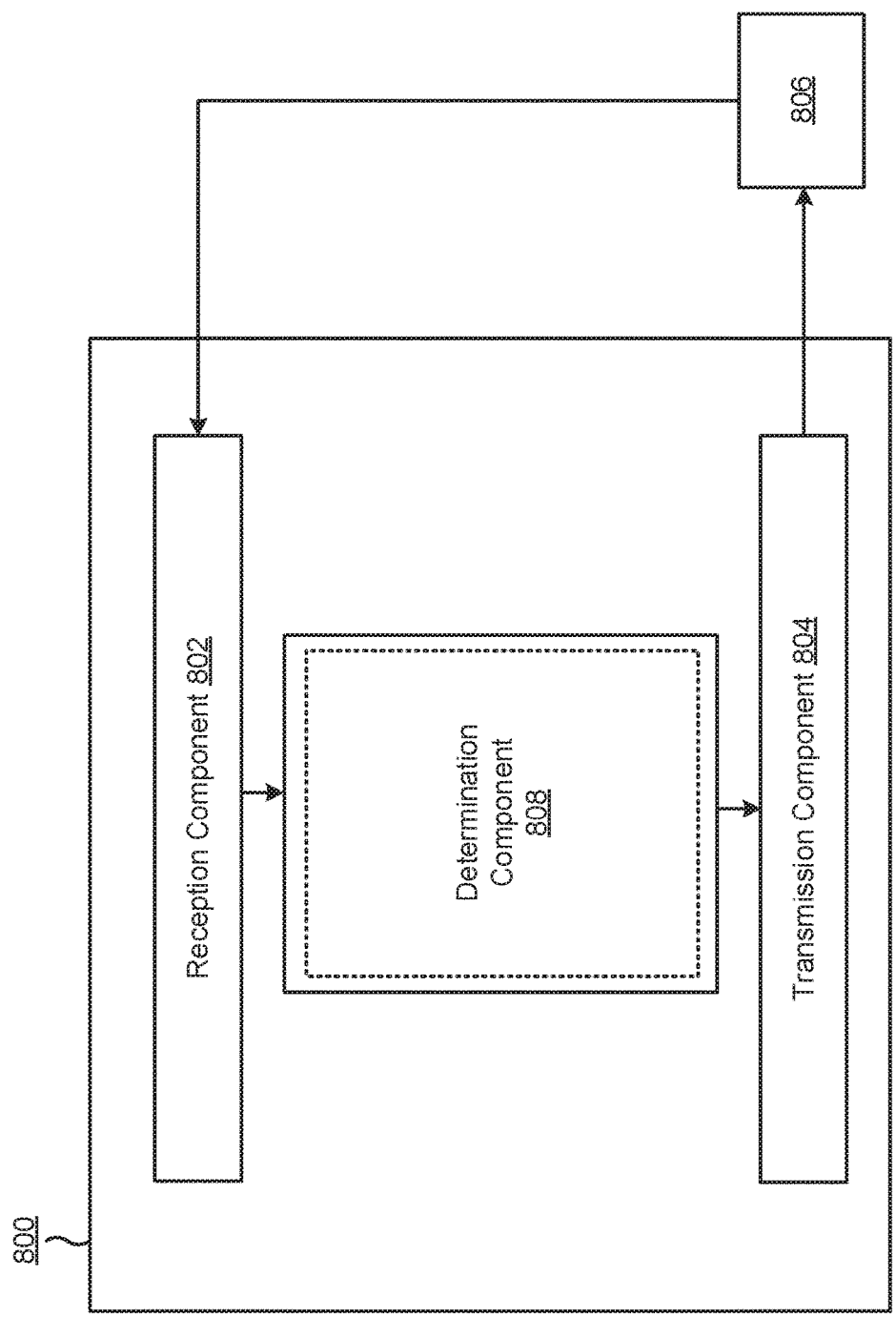

The BS 110d may receive (e.g., using antenna 234, DEMOD 232, MIMO detector 236, receive processor 238, controller/processor 240, memory 242, reception component 802 of FIG. 8, and/or the like) the indication of the measurement report. The BS 110d may determine (e.g., using receive processor 258, transmit processor 264, controller/processor 280, memory 282, determination component 808 of FIG. 8, and/or the like) a plurality of RRM measurement objects and/or an RRM measurement parameter range for the UE 120. In some aspects, the BS 110d determines the RRM measurement objects and/or the RRM measurement parameter range based at least in part on the mobility prediction. An RRM measurement object (e.g., MeasObjectNR) may include an RRM measurement configuration including one or more RRM measurement parameters. Each RRM measurement object may be associated with a different mobility prediction. In this way, each mobility prediction may be associated with a particular set of RRM measurement parameters. The RRM measurement parameter range may include a range for each of one or more RRM measurement parameters. In this way, the UE 120 may determine, identify, and/or select RRM measurement parameters within the RRM measurement parameter range.

As further shown in FIG. 4, and by reference number 406, the BS 110d may transmit an indication of the RRM measurement objects and/or the RRM measurement parameter range to the UE 120. In some aspects, the BS 110d may transmit the indication of the RRM measurement objects and/or the RRM measurement parameter range to the UE 120 on a downlink of the access link. The BS 110d may transmit the indication of the RRM measurement objects and/or the RRM measurement parameter range to the UE 120 in a downlink communication, such as an RRC communication, a downlink control information (DCI) communication, a medium access control control element (MAC-CE) communication, and/or another type of downlink communication.

As further shown in FIG. 4, and by reference number 408, the UE 120 (e.g., using receive processor 258, transmit processor 264, controller/processor 280, memory 282, RRM measurement parameter component 710, and/or the like) may determine one or more RRM measurement parameters. In some aspects, the UE 120 determines the one or more RRM measurement parameters based at least in part on the mobility prediction, as described above in connection with FIG. 3. Additionally and/or alternatively, the UE 120 may determine the one or more RRM measurement parameters based at least in part on the RRM measurement objects and/or the RRM measurement parameter range. For example, the UE 120 may determine an RRM measurement object associated with the mobility prediction and may determine the one or more RRM measurement parameters included in the RRM measurement object. As another example, the UE 120 may determine the one or more RRM measurement parameters such that the one or more RRM measurement parameters are within the RRM measurement parameter range.

In some aspects, the UE 120 may perform (e.g., using antenna 252, DEMOD 254, MIMO detector 256, receive processor 258, controller/processor 280, memory 282, transmit processor 264, TX MIMO processor 266, MOD 254, memory 282, and/or the like) one or more RRM measurements based at least in part on the one or more RRM measurement parameters. In some aspects, the UE 120 may perform the one or more RRM measurements as described above in connection with FIG. 3 and/or elsewhere described herein.

In this way, the UE 120 may determine to reduce or relax RRM measurements for particular cells and/or may determine to maintain a baseline level of RRM measurements for other cells based at least in part on the mobility prediction. This enables the UE 120 to reduce resource consumption (e.g., processing resources, memory resources, battery resources, radio resources, and/or the like) while maintaining a high level of handover reliability and mobility reliability.

As indicated above, FIG. 4 is provided as an example. Other examples may differ from what is described with respect to FIG. 4.

Figure 5:
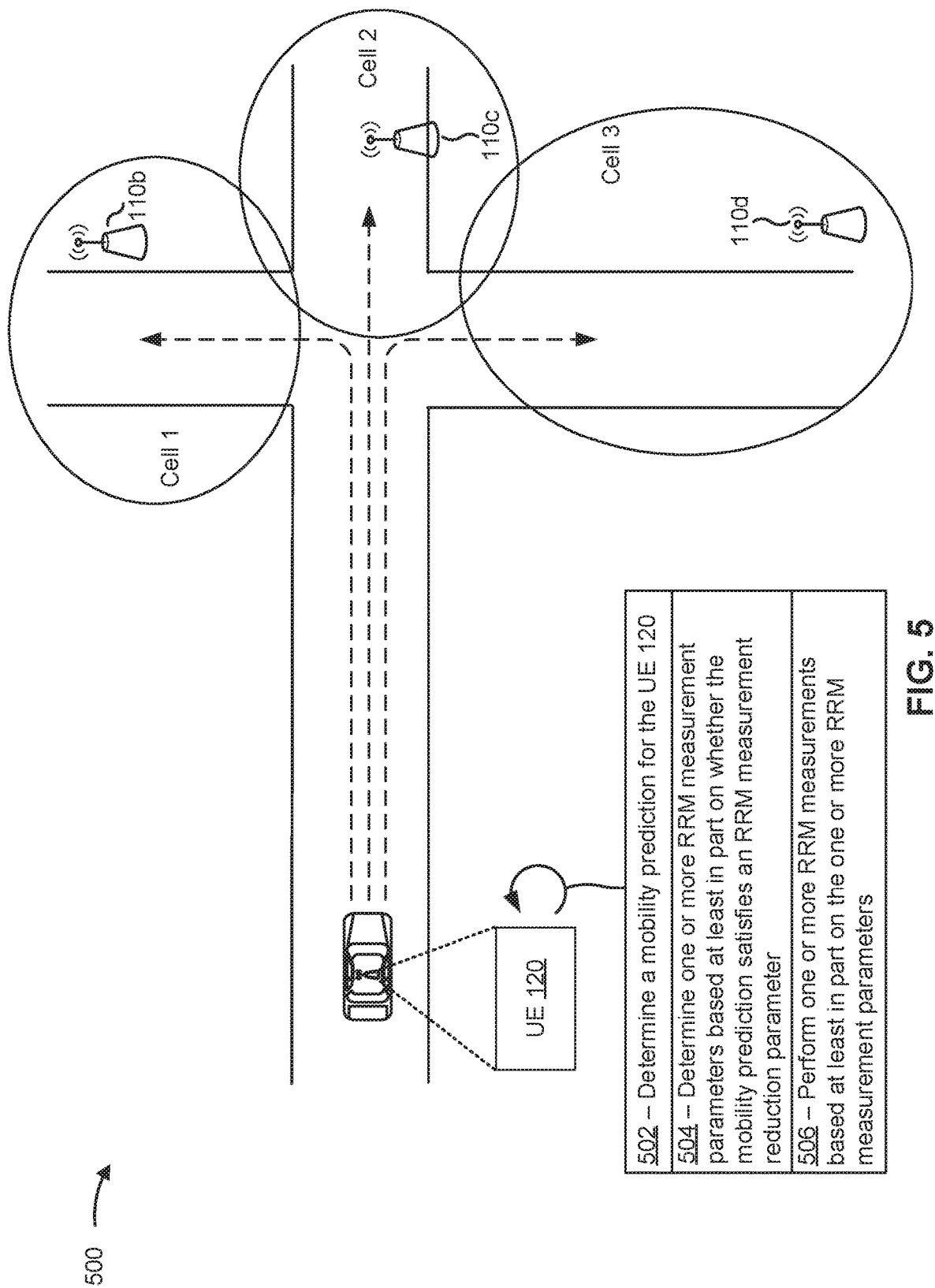

FIG. 5 is a diagram illustrating an example 500 associated with UE mobility prediction based RRM, in accordance with various aspects of the present disclosure. As shown in FIG. 5, example 500 includes a UE 120 and one or more BSs 110 (e.g., BS 110a, BS 110b, BS 110c, and/or the like). In some aspects, the BSs 110 and the UE 120 may be included in a wireless network, such as wireless network 100. BSs 110 and the UE 120 may communicate on a wireless access link, which may include an uplink and a downlink.

The BSs 110 may each provide a cell in which wireless communication devices (e.g., UEs) may be served with access to the wireless network. For example, the BS 110a may provide cell 1, the BS 110b may provide cell 2, and the BS 110c may provide cell 3. Cells 1-3 may be neighboring cells or cells that are not serving the UE 120. UE 120 is capable of performing RRM measurements for purposes of RRM. In these cases, the UE 120 may perform one or more signal measurements, latency measurements, distance measurements, and/or other types of measurements associated with cells 1-3 to support handover of the UE 120 and/or for other purposes. In some aspects, the UE 120 may not be communicatively connected with a BS 110 and/or may not be served by a BS 110. In these cases, the UE 120 may operate in an RRC idle mode or an RRC inactive mode.

As shown in FIG. 5, and by reference number 502, the UE 120 may determine (e.g., using receive processor 258, transmit processor 264, controller/processor 280, memory 282, sensor(s) 286, mobility prediction component 708, and/or the like) a mobility prediction for the UE 120. In some aspects, the UE 120 determines the mobility prediction based at least in part on one or more techniques described above in connection with FIG. 3 and/or other techniques for mobility prediction.

As further shown in FIG. 5, and by reference number 504, the UE 120 (e.g., using receive processor 258, transmit processor 264, controller/processor 280, memory 282, RRM measurement parameter component 710, and/or the like) may determine one or more RRM measurement parameters. In some aspects, the UE 120 determines the one or more RRM measurement parameters based at least in part on the mobility prediction, as described above in connection with FIG. 3.

Additionally and/or alternatively, the UE 120 may determine the one or more RRM measurement parameters based at least in part on an RRM measurement reduction parameter. The UE 120 may receive an indication of the RRM measurement reduction parameter from a last serving cell or BS 110 of the UE 120 or from another cell or BS 110. For example, the last serving cell or BS 110 may transmit an indication of the RRM measurement reduction parameters to the UE 120 in an RRC release communication. The RRC release communication may further include an indication that RRM measurement reduction or relaxation is permitted for particular cells (or groups of cells or on a per-cell basis) and/or particular frequency carriers (or groups of carriers or on a per-carrier basis), an indication to perform one or more early measurements for cell reselection, and/or the like.

The RRM measurement reduction parameter may include one or more thresholds and/or one or more conditions that, if satisfied, permit the UE 120 to perform RRM measurement reduction and/or relaxation. For example, the RRM measurement reduction parameter may include a signal strength threshold, a signal quality threshold, a mobility threshold, and/or other types of conditions and/or thresholds. If the UE 120 determines that the mobility prediction satisfies the one or more thresholds and/or conditions indicated by the RRM measurement reduction parameter, the UE 120 may reduce and/or relax the RRM measurements for the UE 120.

If the UE 120 determines that the mobility prediction does not satisfy the one or more threshold and/or conditions, the UE 120 may determine the one or more RRM measurement parameters based at least in part on an implementation of the UE 120. In some aspects, the one or more RRM measurement parameters may include intra-frequency cell reselection parameters, inter-frequency cell reselection parameters, and/or inter-RAT target parameters.

In some aspects, the UE 120 may determine the one or more intra-frequency cell reselection parameters (e.g., $S_{IntraSearchP}$, $S_{IntraSearchQ}$, and/or the like) based at least in part on the mobility prediction for the UE 120, historical UE mobility information associated with the UE 120, measurement reports associated with the UE 120 and/or other UEs in the wireless network, and/or the like. In some aspects, the last serving cell or BS 110 of the UE 120, a network controller 130, or another device in the wireless network may determine the one or more intra-frequency cell reselection parameters for the UE 120 (e.g., based at least in part on the mobility prediction for the UE 120, historical UE mobility information associated with the UE 120, measurement reports associated with the UE 120 and/or other UEs in the wireless network, and/or the like).

In some aspects, one or more of the inter-frequency cell reselection parameters include an inter-frequency cell reselection measurement prioritization for the neighboring cells, cells 1-3. The inter-frequency cell reselection measurement prioritization may include a prioritized list of the neighboring cells for inter-frequency cell reselection measurement. The UE 120 may determine the inter-frequency cell reselection measurement prioritization (which may be referred to as a reference prioritization or $cellReselectionPriority_{ref}$) based at least in part on a UE-based inter-frequency cell reselection measurement prioritization determined by the UE 120 (e.g., $cellReselectionPriority_{UE}$-based at least in part on the mobility prediction), based at least in part on a network-based inter-frequency cell reselection measurement prioritization (e.g., $cellReselectionPriority_{Net}$-determined by the last serving cell or BS 110 of the UE 120), and/or a tradeoff parameter ($\alpha$). For example, the UE 120 may determine the inter-frequency cell reselection measurement prioritization based at least in part on:

$$cellReselectionPriority_{ref}=\alpha*cellReselectionPriority_{UE}+(1+\alpha)*cellReselectionPriority_{Net}$$

The UE 120 may receive (e.g., using antenna 252, DEMOD 254, MIMO detector 256, receive processor 258, controller/processor 280, memory 282, reception component 702, and/or the like) an indication of the network-based inter-frequency cell reselection measurement prioritization and an indication of the tradeoff parameter ($\alpha$) in system information, in an RRC connection release communication from a last serving cell or BS 110 of the UE 120, and/or the like. The tradeoff parameter ($\alpha$) may be a variable value (e.g., interFrequencytradeoffPar) and can be configured and/or optimized subsequently by the BS 110.

In some aspects, one or more of the inter-RAT target parameters include an inter-RAT target measurement prioritization for the neighboring cells, cells 1-3. The inter-RAT target measurement prioritization may include a prioritized list of the neighboring cells for inter-RAT target measurement. The UE 120 may determine the inter-RAT target measurement prioritization (which may be referred to as a reference prioritization or $interRATPriority_{ref}$) based at least in part on a UE-based inter-RAT target measurement prioritization determined by the UE 120 (e.g., $interRATPriority_{UE}$-based at least in part on the mobility prediction), based at least in part on a network-based inter-RAT target measurement prioritization (e.g., $interRATPriority_{Net}$-determined by the last serving cell or BS 110 of the UE 120), and/or a tradeoff parameter ($\beta$). For example, the UE 120 may determine the inter-RAT target measurement prioritization based at least in part on:

$$interRATPriority_{ref}=\beta*interRATPriority_{UE}+(1-\beta)*interRATPriority_{Net}$$

The UE 120 may receive (e.g., using antenna 252, DEMOD 254, MIMO detector 256, receive processor 258, controller/processor 280, memory 282, reception component 702, and/or the like) an indication of the network-based inter-RAT target measurement prioritization and an indication of the tradeoff parameter ($\beta$) in system information, in an RRC connection release communication from a last serving cell or BS 110 of the UE 120, and/or the like. The tradeoff parameter ($\beta$) may be a variable value (e.g., interRATtradeoffPar) and can be configured and/or optimized subsequently by the BS 110. In some aspects, the tradeoff parameter ($\beta$) for inter-RAT target measurement prioritization may be the same value as the tradeoff parameter ($\alpha$) for inter-frequency cell reselection measurement prioritization. In some aspects, the tradeoff parameter ($\beta$) for inter-RAT target measurement prioritization and the tradeoff parameter ($\alpha$) for inter-frequency cell reselection measurement prioritization may be different values.

In some aspects, the UE 120 may perform (e.g., using antenna 252, DEMOD 254, MIMO detector 256, receive processor 258, controller/processor 280, memory 282, transmit processor 264, TX MIMO processor 266, MOD 254, memory 282, and/or the like) one or more RRM measurements based at least in part on the one or more RRM measurement parameters. In some aspects, the UE 120 may perform the one or more RRM measurements as described above in connection with FIG. 3 and/or elsewhere described herein.

In this way, the UE 120 may determine to reduce or relax RRM measurements for particular cells and/or may determine to maintain a baseline level of RRM measurements for other cells based at least in part on the mobility prediction. This enables the UE 120 to reduce resource consumption (e.g., processing resources, memory resources, battery resources, radio resources, and/or the like) while maintaining a high level of handover reliability and mobility reliability.

As indicated above, FIG. 5 is provided as an example. Other examples may differ from what is described with respect to FIG. 5.

Figure 6:
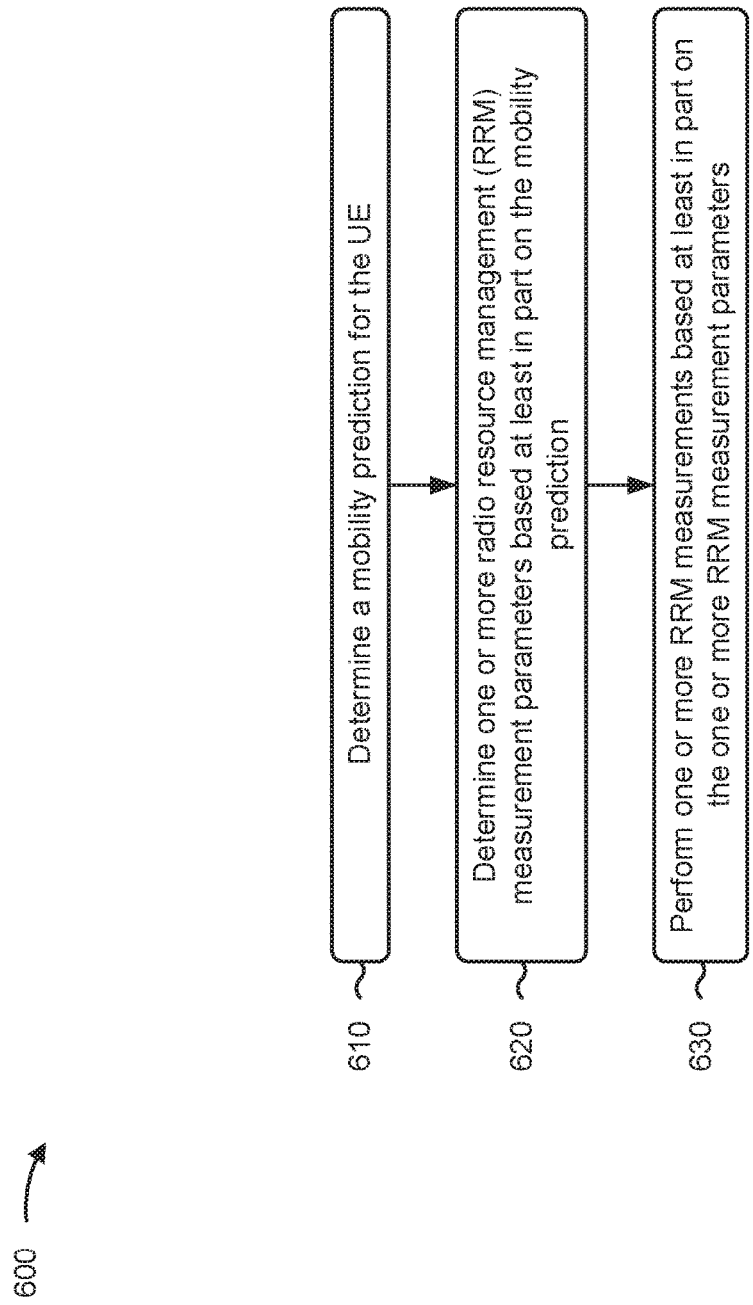
FIG. 6 is a diagram illustrating an example process associated with UE mobility prediction based RRM, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 of one or more of FIGS. 1-5, apparatus 700 of FIG. 7, and/or the like) performs operations associated with techniques for UE mobility prediction based RRM.

As shown in FIG. 6, in some aspects, process 600 may include determining a mobility prediction for the UE (block 610). For example, the UE (e.g., using antenna 252, demodulator 254, MIMO detector 256, receive processor 258, transmit processor 264, TX MIMO processor 266, modulator 254, controller/processor 280, memory 282, sensor(s) 286, and/or mobility prediction component 708 of FIG. 7) may determine a mobility prediction for the UE, as described above.

As further shown in FIG. 6, in some aspects, process 600 may include determining one or more RRM measurement parameters based at least in part on the mobility prediction (block 620). For example, the UE (e.g., using antenna 252, demodulator 254, MIMO detector 256, receive processor 258, transmit processor 264, TX MIMO processor 266, modulator 254, controller/processor 280, memory 282, and/or RRM measurement parameter component 710 of FIG. 7) may determine one or more RRM measurement parameters based at least in part on the mobility prediction, as described above.

As further shown in FIG. 6, in some aspects, process 600 may include performing one or more RRM measurements based at least in part on the one or more RRM measurement parameters (block 630). For example, the UE (e.g., using antenna 252, demodulator 254, MIMO detector 256, receive processor 258, transmit processor 264, TX MIMO processor 266, modulator 254, controller/processor 280, memory 282, and/or RRM measurement component 712 of FIG. 7) may perform one or more RRM measurements based at least in part on the one or more RRM measurement parameters, as described above.

Process 600 may include additional aspects, such as any single aspect or any combination of aspects described below and/or in connection with one or more other processes described elsewhere herein.

In a first aspect, determining the one or more RRM measurement parameters comprises determining (e.g., using receive processor 258, transmit processor 264, controller/processor 280, memory 282, RRM measurement parameter component 710, and/or the like) one or more reduced RRM measurement parameters that are reduced relative to one or more baseline RRM measurement parameters. In a second aspect, alone or in combination with the first aspect, the one or more reduced RRM measurement parameters comprise at least one of a reduced number of RRM measurements relative to a baseline number of RRM measurements included in the one or more baseline RRM measurement parameters, a reduced RRM measurement time duration relative to a baseline RRM measurement time duration included in the one or more baseline RRM measurement parameters, or a reduced number of RRM measurement targets relative to a baseline number of RRM measurement targets included in the one or more baseline RRM measurement parameters.

In a third aspect, alone or in combination with one or more of the first and second aspects, determining the one or more reduced RRM measurement parameters comprises determining (e.g., using receive processor 258, transmit processor 264, controller/processor 280, memory 282, RRM measurement parameter component 710, and/or the like) the reduced number of RRM measurement targets based at least in part on at least one of mobility prediction for the UE indicating that a probability that the UE will travel into one or more neighboring cells does not satisfy a first threshold, a signal measurement for a serving cell of the UE satisfying a second threshold, or a priority of the serving cell being greater than respective priorities of each of the one or more neighboring cells. In a fourth aspect, alone or in combination with one or more of the first through third aspects, the UE is in an RRC connected mode with a BS, and the method further comprises transmitting (e.g., using controller/processor 280, transmit processor 264, TX MIMO processor 266, MOD 254, antenna 252, memory 282, transmission component of FIG. 7, and/or the like), to the BS, an indication of the mobility prediction for the UE.

Figure 7:
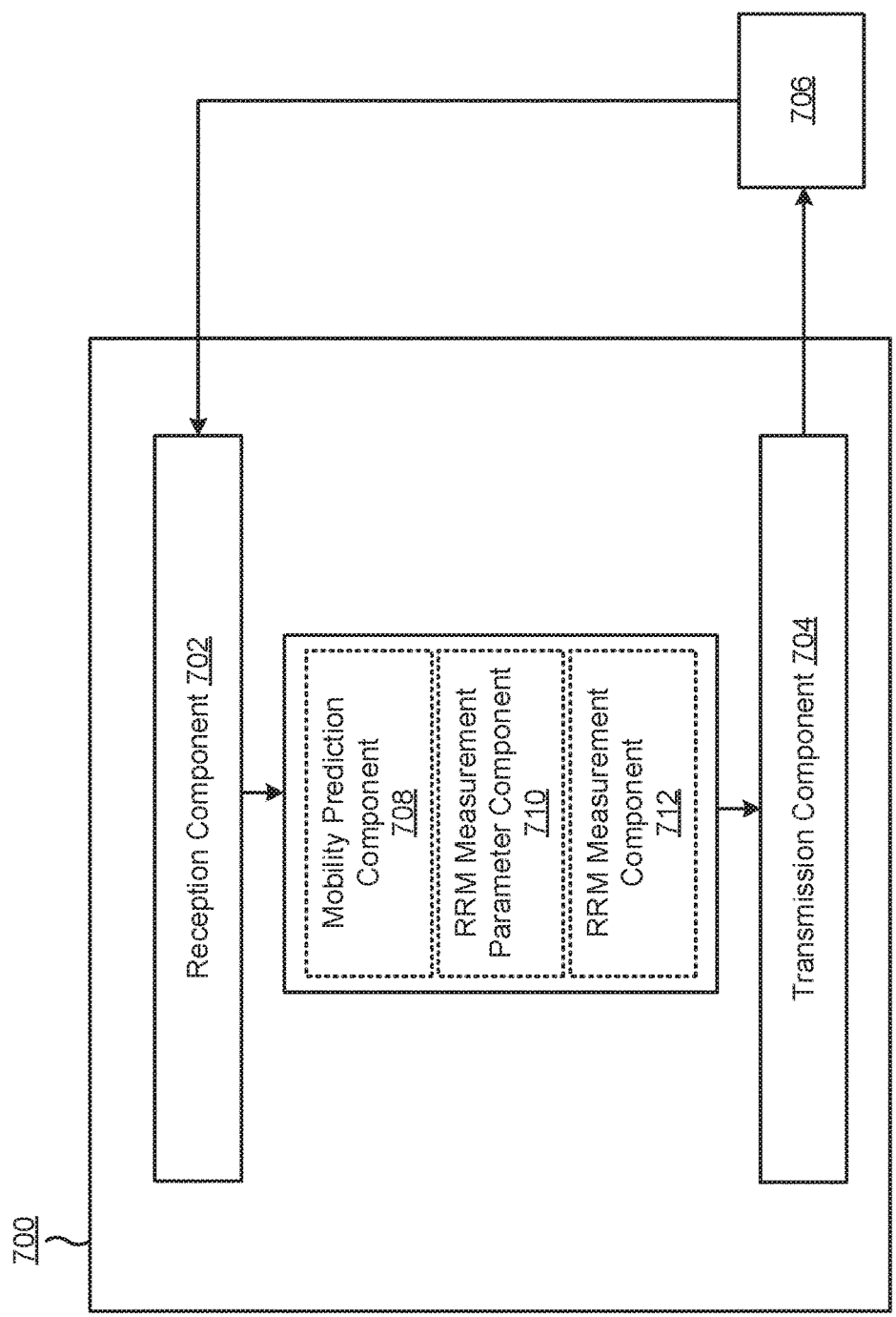
FIGS. 7 and 8 are block diagrams of example apparatuses for wireless communication, in accordance with various aspects of the present disclosure.

In a fifth aspect, alone or in combination with one or more of the first through fourth aspects, transmitting the indication of the mobility prediction comprises transmitting (e.g., using controller/processor 280, transmit processor 264, TX MIMO processor 266, MOD 254, antenna 252, memory 282, transmission component of FIG. 7, and/or the like) the indication of the mobility prediction in at least one of a UE assistance information communication, a measurement report, an RRC reconfiguration complete communication, or an RRC communication. In a sixth aspect, alone or in combination with one or more of the first through fifth aspects, the mobility prediction indicates at least one of a neighboring cell, a probability that the UE will move into the neighboring cell, a confidence level of the probability, an expected arrival time in the neighboring cell, a route identifier, or a probability that the UE will use a route associated with the route identifier.

In a seventh aspect, alone or in combination with one or more of the first through sixth aspects, process 600 includes receiving (e.g., using antenna 252, DEMOD 254, MIMO detector 256, receive processor 258, controller/processor 280, memory 282, reception component 702 of FIG. 7, and/or the like), from the BS, an indication of a plurality of RRM measurement objects, and wherein determining the one or more RRM measurement parameters comprises determining (e.g., using receive processor 258, transmit processor 264, controller/processor 280, memory 282, RRM measurement parameter component 710, and/or the like) determining an RRM measurement object from the plurality of RRM measurement objects based at least in part on the mobility prediction; and determining the one or more RRM measurement parameters based at least in part on the RRM measurement object. In an eighth aspect, alone or in combination with one or more of the first through seventh aspects, process 600 includes receiving (e.g., using antenna 252, DEMOD 254, MIMO detector 256, receive processor 258, controller/processor 280, memory 282, reception component 702 of FIG. 7, and/or the like), from the BS, an indication of an RRM measurement parameter range, and wherein determining the one or more RRM measurement parameters comprises determining (e.g., using receive processor 258, transmit processor 264, controller/processor 280, memory 282, RRM measurement parameter component 710, and/or the like) the one or more RRM measurement parameters based at least in part on the mobility prediction for the UE and the RRM measurement parameter range.

In a ninth aspect, alone or in combination with one or more of the first through eighth aspects, the UE is in an RRC idle mode or an RRC inactive mode, and wherein determining the one or more RRM measurement parameters comprises determining (e.g., using receive processor 258, transmit processor 264, controller/processor 280, memory 282, RRM measurement parameter component 710, and/or the like) that the mobility prediction for the UE satisfies an RRM measurement reduction parameter, and determining (e.g., using receive processor 258, transmit processor 264, controller/processor 280, memory 282, RRM measurement parameter component 710, and/or the like) the one or more RRM measurement parameters based at least in part on a determination that that mobility prediction for the UE satisfies the RRM measurement reduction parameter. In a tenth aspect, alone or in combination with one or more of the first through ninth aspects, process 600 includes receiving (e.g., using antenna 252, DEMOD 254, MIMO detector 256, receive processor 258, controller/processor 280, memory 282, reception component 702, and/or the like), in an RRC release communication, at least one of an indication that RRM measurement reduction is permitted for the UE, an indication of the RRM measurement reduction parameter, or an indication to perform one or more early measurements.

In an eleventh aspect, alone or in combination with one or more of the first through tenth aspects, RRM measurement reduction is indicated as being permitted on at least one of a per-carrier basis or a per-cell basis. In a twelfth aspect, alone or in combination with one or more of the first through eleventh aspects, the UE is in RRC idle mode or an RRC inactive mode, and wherein determining the one or more RRM measurement parameters comprises determining (e.g., using receive processor 258, transmit processor 264, controller/processor 280, memory 282, RRM measurement parameter component 710, and/or the like) that the mobility prediction for the UE does not satisfy an RRM measurement reduction parameter, and determining (e.g., using receive processor 258, transmit processor 264, controller/processor 280, memory 282, RRM measurement parameter component 710, and/or the like) the one or more RRM measurement parameters based at least in part on a determination that that mobility prediction for the UE does not satisfy the RRM measurement reduction parameter.

In a thirteenth aspect, alone or in combination with one or more of the first through twelfth aspects, the one or more RRM measurement parameters include one or more intra-frequency cell reselection parameters, and wherein determining the one or more RRM measurement parameters comprises determining (e.g., using receive processor 258, transmit processor 264, controller/processor 280, memory 282, RRM measurement parameter component 710, and/or the like) the one or more intra-frequency cell reselection parameters based at least in part on at least one of the mobility prediction for the UE, historical UE mobility information, or one or more measurement reports associated with at least one of the UE or one or more other UEs.

In a fourteenth aspect, alone or in combination with one or more of the first through thirteenth aspects, the one or more RRM measurement parameters include an inter-frequency cell reselection measurement prioritization for a plurality of neighboring cells, and wherein determining the one or more RRM measurement parameters comprises determining (e.g., using receive processor 258, transmit processor 264, controller/processor 280, memory 282, RRM measurement parameter component 710, and/or the like) a UE-based inter-frequency cell reselection measurement prioritization based at least in part on the mobility prediction for the UE, and determining (e.g., using receive processor 258, transmit processor 264, controller/processor 280, memory 282, RRM measurement parameter component 710, and/or the like) the inter-frequency cell reselection measurement prioritization based at least in part on at least one of the UE-based inter-frequency cell reselection measurement prioritization, a network-based inter-frequency cell reselection measurement prioritization, or a tradeoff parameter.

In a fifteenth aspect, alone or in combination with one or more of the first through fourteenth aspects, process 600 includes receiving (e.g., using antenna 252, DEMOD 254, MIMO detector 256, receive processor 258, controller/processor 280, memory 282, reception component 702, and/or the like) an indication of the network-based inter-frequency cell reselection measurement prioritization and an indication of the tradeoff parameter in at least one of system information, or an RRC connection release communication.

In a sixteenth aspect, alone or in combination with one or more of the first through fifteenth aspects, the one or more RRM measurement parameters include an inter-RAT target measurement prioritization for a plurality of neighboring RATs, and wherein determining the one or more RRM measurement parameters comprises determining (e.g., using receive processor 258, transmit processor 264, controller/processor 280, memory 282, RRM measurement parameter component 710, and/or the like) a UE-based inter-RAT target measurement prioritization based at least in part on the mobility prediction for the UE, and determining (e.g., using receive processor 258, transmit processor 264, controller/processor 280, memory 282, RRM measurement parameter component 710, and/or the like) the inter-RAT target measurement prioritization based at least in part on at least one of the UE-based inter-RAT target measurement prioritization, a network-based inter-RAT target measurement prioritization, or a tradeoff parameter.

In a seventeenth aspect, alone or in combination with one or more of the first through sixteenth aspects, process 600 includes receiving (e.g., using antenna 252, DEMOD 254, MIMO detector 256, receive processor 258, controller/processor 280, memory 282, reception component 702, and/or the like) an indication of the network-based inter-RAT target measurement prioritization and an indication of the tradeoff parameter in at least one of system information, or an RRC connection release communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a block diagram of an example apparatus 700 for wireless communication. The apparatus 700 may be a UE (e.g., UE 120 of one or more of FIGS. 1-5), or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE 120, a base station 110, or another wireless communication device) using the reception component 702 and the transmission component 704. As further shown, the apparatus 700 may include one or more of a mobility prediction component 708, an RRM measurement parameter component 710, or an RRM measurement component 712, among other examples.

In some aspects, the apparatus 700 may be configured to perform one or more operations described herein in connection with FIGS. 3-5. Additionally or alternatively, the apparatus 700 may be configured to perform one or more processes described herein, such as process 600 of FIG. 6. In some aspects, the apparatus 700 and/or one or more components shown in FIG. 7 (e.g., components 702, 704, and/or 708-712) may include one or more components of the UE described above in connection with FIG. 2, such as an antenna 252, a MOD 254, a DEMOD 254, MIMO detector 256, a receive processor 258, a transmit processor 264, a TX MIMO processor 266, a controller/processor 280, memory 282, sensor(s) 286, and/or the like). Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas 252, a demodulator 254, a MIMO detector 256, a receive processor 258, a controller/processor 280, a memory 282, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas 252, a modulator 254, a transmit MIMO processor 266, a transmit processor 264, a controller/processor 280, a memory 282, or a combination thereof, of the UE described above in connection with FIG. 2. In some aspects, the transmission component 704 may be collocated with the reception component 702 in a transceiver.

The mobility prediction component 708 may determine a mobility prediction for the apparatus 700. In some aspects, the transmission component 704 may transmit an indication of the mobility prediction to the apparatus 706. The RRM measurement parameter component 710 may determine one or more RRM measurement parameters based at least in part on the mobility prediction.

In some aspects, reception component 702 may receive, from the apparatus 706, an indication of an RRM measurement object and/or an RRM measurement parameter range. In some aspects, the RRM measurement parameter component 710 may determine the one or more RRM measurement parameters based at least in part on the RRM measurement object and/or the RRM measurement parameter range.

In some aspects, reception component 702 may receive, from the apparatus 706, an indication of an RRM measurement reduction parameter. In some aspects, the RRM measurement parameter component 710 may determine whether the mobility prediction satisfies the RRM measurement reduction parameter and may determine the one or more RRM measurement parameters based at least in part on whether the mobility prediction satisfies the RRM measurement reduction parameter The RRM measurement component 712 may perform one or more RRM measurements based at least in part on the one or more RRM measurement parameters.

The mobility prediction component 708 may include one or more of a receive processor 258, a transmit processor 264, a controller/processor 280, a memory 282, and/or sensor(s) 286. The RRM measurement parameter component 710 may include one or more of a receive processor 258, a transmit processor 264, a controller/processor 280, and/or a memory 282. The RRM measurement component 712 may include one or more of a receive processor 258, a transmit processor 264, a controller/processor 280, and/or a memory 282.

The mobility prediction component 708, the RRM measurement parameter component 710, and/or the RRM measurement component 712 may a memory. The mobility prediction component 708, the RRM measurement parameter component 710, and/or the RRM measurement component 712 may one or more processors operatively coupled to the memory, the memory and the one or more processors configured. The mobility prediction component 708, the RRM measurement parameter component 710, and/or the RRM measurement component 712 may one or more instructions that, when executed by one or more processors of a UE, cause the UE to determine a mobility prediction for the UE, determine one or more RRM measurement parameters based at least in part on the mobility prediction, and perform one or more RRM measurements based at least in part on the one or more RRM measurement parameters.

The mobility prediction component 708 may include means for determining a mobility prediction for the apparatus. The RRM measurement parameter component 710 may include means for determining one or more RRM measurement parameters based at least in part on the mobility prediction. The RRM measurement component 712 may include means for performing one or more RRM measurements based at least in part on the one or more RRM measurement parameters.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

FIG. 8 is a block diagram of an example apparatus 800 for wireless communication. The apparatus 800 may be a BS (e.g., BS 110 of one or more of FIGS. 1-5), or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIGS. 3-5. Additionally or alternatively, the apparatus 800 may be configured to perform one or more processes described herein. In some aspects, the apparatus 800 and/or one or more components shown in FIG. 8 may include one or more components of the BS described above in connection with FIG. 2. Additionally, or alternatively, one or more components 802, 804, and/or 808 shown in FIG. 8 may be implemented within one or more components described above in connection with FIG. 2, such as an antenna 234, a DEMOD 232, a MIMO detector 236, a receive processor 238, a controller/processor 240, a memory 242, a transmit processor 220, a TX MIMO processor 230, a MOD 232, and/or the like. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas 234, a demodulator 232, a MIMO detector 236, a receive processor 238, a controller/processor 240, a memory 242, or a combination thereof, of the BS 110 described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas 234, a modulator 232, a transmit MIMO processor 230, a transmit processor 220, a controller/processor 240, a memory 242, or a combination thereof, of the BS 110 described above in connection with FIG. 2. In some aspects, the transmission component 804 may be collocated with the reception component 802 in a transceiver.

The determination component 808 may determine one or more of an RRM measurement object for the apparatus 806, an RRM measurement parameter range for the apparatus 806, an RRM measurement reduction parameter for the apparatus 806, and/or the like. In some aspects, the reception component 802 may receive an indication of the mobility prediction from the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining a mobility prediction for the UE;
    determining one or more radio resource management (RRM) measurement parameters based at least in part on the mobility prediction; and
    performing one or more RRM measurements based at least in part on the one or more RRM measurement parameters.

2. The method of claim 1, wherein determining the one or more RRM measurement parameters comprises:

determining one or more reduced RRM measurement parameters that are reduced relative to one or more baseline RRM measurement parameters.

3. The method of claim 2, wherein the one or more reduced RRM measurement parameters comprise at least one of:
  a reduced number of RRM measurements relative to a baseline number of RRM measurements included in the one or more baseline RRM measurement parameters,
  a reduced RRM measurement time duration relative to a baseline RRM measurement time duration included in the one or more baseline RRM measurement parameters, or
  a reduced number of RRM measurement targets relative to a baseline number of RRM measurement targets included in the one or more baseline RRM measurement parameters.

4. The method of claim 2, wherein the one or more reduced RRM measurement parameters comprise a reduced number of RRM measurement targets relative to a baseline number of RRM measurement targets included in the one or more baseline RRM measurement parameters; and
  wherein determining the one or more reduced RRM measurement parameters comprises:
    determining the reduced number of RRM measurement targets based at least in part on at least one of:
      the mobility prediction indicating that a probability that the UE will travel into one or more neighboring cells does not satisfy a first threshold,
      a signal measurement for a serving cell of the UE satisfying a second threshold, or
      a priority of the serving cell being greater than respective priorities of each of the one or more neighboring cells.

5. The method of claim 1, wherein the UE is in a radio resource control (RRC) connected mode with a base station (BS); and
  the method further comprises:
    transmitting, to the BS, an indication of the mobility prediction.

6. The method of claim 5, wherein transmitting the indication of the mobility prediction comprises:
  transmitting the indication of the mobility prediction in at least one of:
    a UE assistance information communication,
    a measurement report,
    an RRC reconfiguration complete communication, or
    an RRC communication.

7. The method of claim 5, wherein the mobility prediction indicates at least one of:
  a neighboring cell,
  a probability that the UE will move into the neighboring cell,
  a confidence level of the probability,
  an expected arrival time in the neighboring cell,
  a route identifier, or
  a probability that the UE will use a route associated with the route identifier.

8. The method of claim 5, further comprising:
  receiving, from the BS, an indication of a plurality of RRM measurement objects; and
  wherein determining the one or more RRM measurement parameters comprises:
    determining an RRM measurement object, from the plurality of RRM measurement objects, based at least in part on the mobility prediction; and
    determining the one or more RRM measurement parameters based at least in part on the RRM measurement object.

9. The method of claim 5, further comprising:
  receiving, from the BS, an indication of an RRM measurement parameter range; and
  wherein determining the one or more RRM measurement parameters comprises:
    determining the one or more RRM measurement parameters based at least in part on the mobility prediction and the RRM measurement parameter range.

10. The method of claim 1, wherein the UE is in a radio resource control (RRC) idle mode or an RRC inactive mode; and
  wherein determining the one or more RRM measurement parameters comprises:
    determining that the mobility prediction satisfies an RRM measurement reduction parameter; and
    determining the one or more RRM measurement parameters based at least in part on a determination that that mobility prediction satisfies the RRM measurement reduction parameter.

11. The method of claim 10, further comprising:
  receiving, in an RRC release communication, at least one of:
    an indication that RRM measurement reduction is permitted for the UE,
    an indication of the RRM measurement reduction parameter, or
    an indication to perform one or more early measurements.

12. The method of claim 11, wherein RRM measurement reduction is indicated as being permitted on at least one of a per-carrier basis or a per-cell basis.

13. The method of claim 1, wherein the UE is in a radio resource control (RRC) idle mode or an RRC inactive mode; and
  wherein determining the one or more RRM measurement parameters comprises:
    determining that the mobility prediction does not satisfy an RRM measurement reduction parameter; and
    determining the one or more RRM measurement parameters based at least in part on a determination that that mobility prediction does not satisfy the RRM measurement reduction parameter.

14. The method of claim 13, wherein the one or more RRM measurement parameters include one or more intra-frequency cell reselection parameters; and
  wherein determining the one or more RRM measurement parameters comprises:
    determining the one or more intra-frequency cell reselection parameters based at least in part on at least one of:
      the mobility prediction,
      historical UE mobility information, or
      one or more measurement reports associated with at least one of the UE or one or more other UEs.

15. The method of claim 13, wherein the one or more RRM measurement parameters include an inter-frequency cell reselection measurement prioritization for a plurality of neighboring cells; and
  wherein determining the one or more RRM measurement parameters comprises:
    determining a UE-based inter-frequency cell reselection measurement prioritization based at least in part on the mobility prediction; and determining the inter-frequency cell reselection measurement prioritization based at least in part on at least one of:
- the UE-based inter-frequency cell reselection measurement prioritization,
- a network-based inter-frequency cell reselection measurement prioritization, or
- a tradeoff parameter.

16. The method of claim 15, further comprising:
receiving an indication of the network-based inter-frequency cell reselection measurement prioritization and an indication of the tradeoff parameter in at least one of:
- system information, or
- an RRC connection release communication.

17. The method of claim 13, wherein the one or more RRM measurement parameters include an inter-radio access technology (RAT) target measurement prioritization for a plurality of neighboring RATs; and
wherein determining the one or more RRM measurement parameters comprises:
- determining a UE-based inter-RAT target measurement prioritization based at least in part on the mobility prediction; and
- determining the inter-RAT target measurement prioritization based at least in part on at least one of:
  - the UE-based inter-RAT target measurement prioritization,
  - a network-based inter-RAT target measurement prioritization, or
  - a tradeoff parameter.

18. The method of claim 17, further comprising:
receiving an indication of the network-based inter-RAT target measurement prioritization and an indication of the tradeoff parameter in at least one of:
- system information, or
- an RRC connection release communication.

19. A user equipment (UE) for wireless communication, comprising:
a memory; and
one or more processors operatively coupled to the memory, the memory and the one or more processors configured to:
- determine a mobility prediction for the UE;
- determine one or more radio resource management (RRM) measurement parameters based at least in part on the mobility prediction; and
- perform one or more RRM measurements based at least in part on the one or more RRM measurement parameters.

20. The UE of claim 19, wherein the one or more processors, when determining the one or more RRM measurement parameters, are configured to:
- determine one or more reduced RRM measurement parameters that are reduced relative to one or more baseline RRM measurement parameters.

21. The UE of claim 20, wherein the one or more reduced RRM measurement parameters comprise at least one of:
- a reduced number of RRM measurements included in a baseline number of RRM measurements included in the one or more baseline RRM measurement parameters,
- a reduced RRM measurement time duration relative to a baseline RRM measurement time duration included in the one or more baseline RRM measurement parameters, or
- a reduced number of RRM measurement targets relative to a baseline number of RRM measurement targets included in the one or more baseline RRM measurement parameters.

22. The UE of claim 20, wherein the one or more reduced RRM measurement parameters comprise a reduced number of RRM measurement targets relative to a baseline number of RRM measurement targets included in the one or more baseline RRM measurement parameters; and
wherein the one or more processors, when determining the one or more reduced RRM measurement parameters, are configured to:
determine the reduced number of RRM measurement targets based at least in part on at least one of:
- the mobility prediction indicating that a probability that the UE will travel into one or more neighboring cells does not satisfy a first threshold,
- a signal measurement for a serving cell of the UE satisfying a second threshold, or
- a priority of the serving cell being greater than respective priorities of each of the one or more neighboring cells.

23. The UE of claim 19, wherein the UE is in a radio resource control (RRC) connected mode with a base station (BS); and
the one or more processors are further configured to:
- transmit, to the BS, an indication of the mobility prediction.

24. The UE of claim 19, wherein the mobility prediction indicates at least one of:
- a neighboring cell,
- a probability that the UE will move into the neighboring cell,
- a confidence level of the probability,
- an expected arrival time in the neighboring cell,
- a route identifier, or
- a probability that the UE will use a route associated with the route identifier.

25. The UE of claim 19, wherein the UE is in a radio resource control (RRC) idle mode or an RRC inactive mode; and
wherein the one or more processors, when determining the one or more RRM measurement parameters, are configured to:
- determine that the mobility prediction satisfies an RRM measurement reduction parameter; and
- determine the one or more RRM measurement parameters based at least in part on a determination that that mobility prediction satisfies the RRM measurement reduction parameter.

26. The UE of claim 19, wherein the UE is in a radio resource control (RRC) idle mode or an RRC inactive mode; and
wherein the one or more processors, when determining the one or more RRM measurement parameters, are configured to:
- determine that the mobility prediction does not satisfy an RRM measurement reduction parameter; and
- determine the one or more RRM measurement parameters based at least in part on a determination that that mobility prediction does not satisfy the RRM measurement reduction parameter.

27. A non-transitory computer-readable medium storing a set of instructions for wireless communication, the set of instructions comprising:

one or more instructions that, when executed by one or more processors of a user equipment (UE), cause the UE to:
  determine a mobility prediction for the UE;
  determine one or more radio resource management (RRM) measurement parameters based at least in part on the mobility prediction; and
  perform one or more RRM measurements based at least in part on the one or more RRM measurement parameters.

28. The non-transitory computer-readable medium of claim 27, wherein the UE is in a radio resource control (RRC) idle mode or an RRC inactive mode; and
  wherein the one or more instructions, that cause the UE to determine the one or more RRM measurement parameters, cause the UE to:
    determine that the mobility prediction satisfies an RRM measurement reduction parameter; and
    determine the one or more RRM measurement parameters based at least in part on a determination that that mobility prediction satisfies the RRM measurement reduction parameter.

29. An apparatus for wireless communication, comprising:
  means for determining a mobility prediction for the apparatus;
  means for determining one or more radio resource management (RRM) measurement parameters based at least in part on the mobility prediction; and
  means for performing one or more RRM measurements based at least in part on the one or more RRM measurement parameters.

30. The apparatus of claim 29, wherein the means for determining the one or more RRM measurement parameters comprises:
  means for determining one or more reduced RRM measurement parameters that are reduced relative to one or more baseline RRM measurement parameters,
    wherein the one or more reduced RRM measurement parameters comprise at least one of:
      a reduced number of RRM measurements relative to a baseline number of RRM measurements included in the one or more baseline RRM measurement parameters,
      a reduced RRM measurement time duration relative to a baseline RRM measurement time duration included in the one or more baseline RRM measurement parameters, or
      a reduced number of RRM measurement targets relative to a baseline number of RRM measurement targets included in the one or more baseline RRM measurement parameters.

* * * * *